May 2, 1950  G. A. LYON  2,505,780
WHEEL COVER
Filed June 2, 1943  2 Sheets-Sheet 1
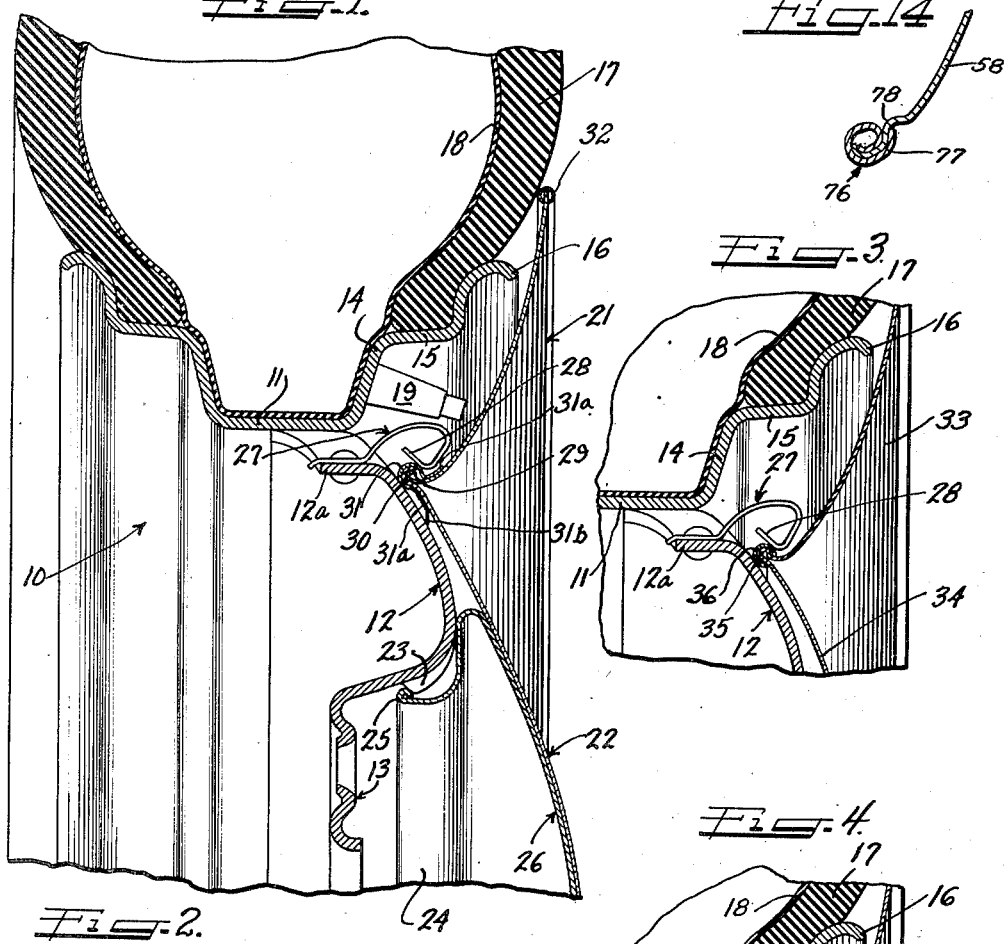
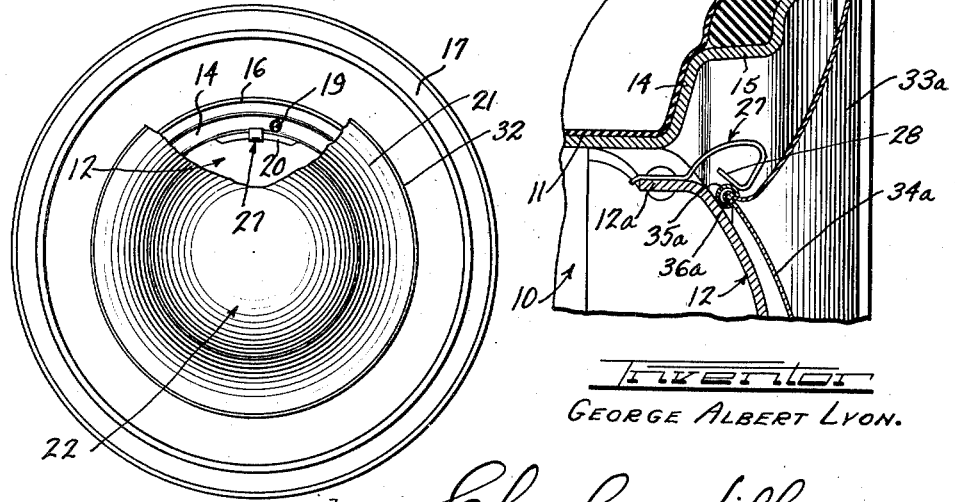
Inventor
GEORGE ALBERT LYON.
by Charles W. Hills, Attys.

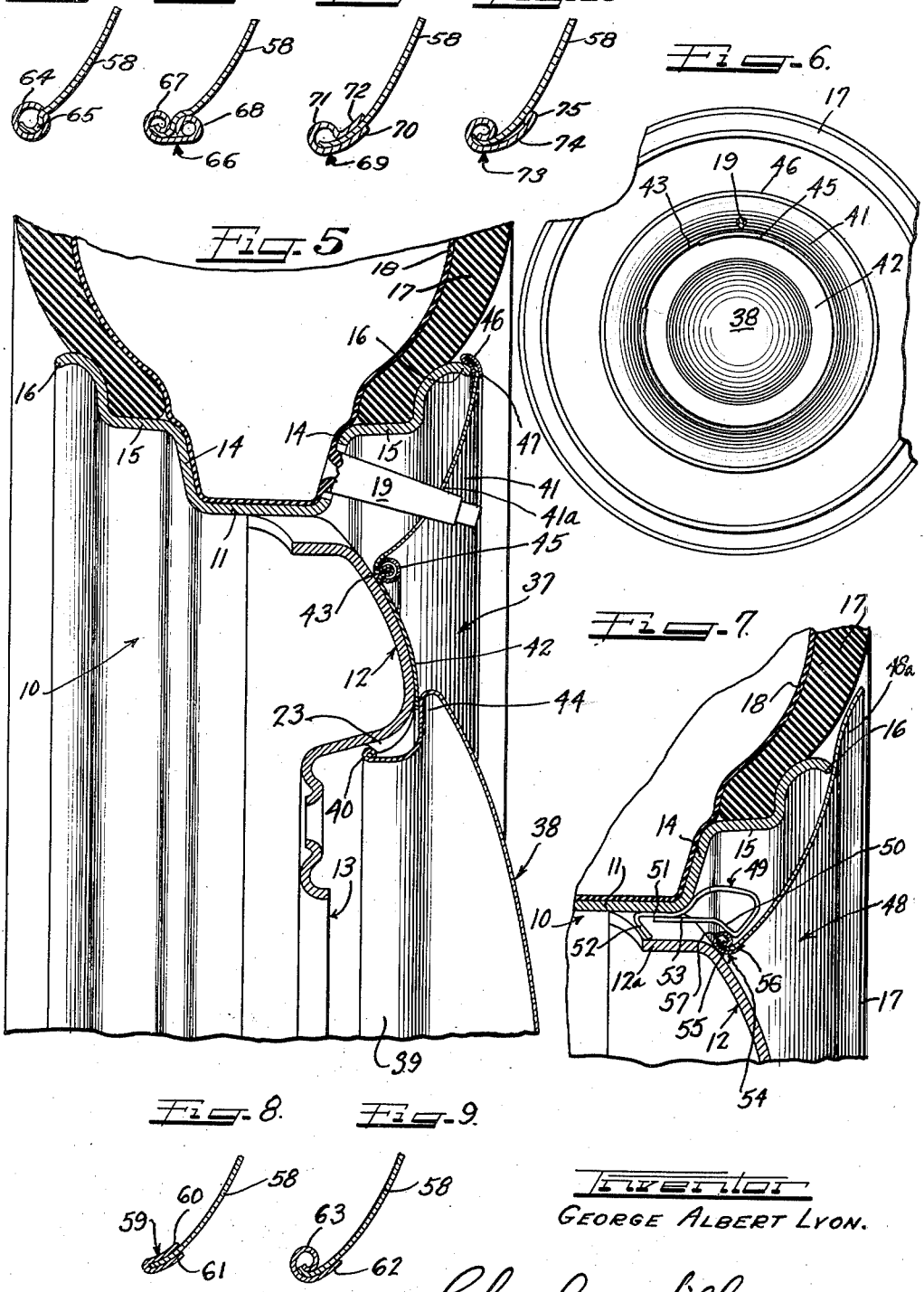

Patented May 2, 1950

2,505,780

UNITED STATES PATENT OFFICE 2,505,780

WHEEL COVER

George Albert Lyon, Allenhurst, N. J.

Application June 2, 1943, Serial No. 489,308

6 Claims. (Cl. 301—37)

This invention relates to an improved wheel structure and is directed more particularly to an improved cover member for use therewith.

It is an important object of the invention to provide improved reinforcing means for a cover adapted for disposition over the outer side of a wheel structure.

Still another object of the invention is to provide improved reinforcing, retaining means for strengthening a cover member and protecting it against breakage, either during a pry-off operation by which it is removed from the wheel structure to which it is secured or during normal use of the wheel structure to which it is secured.

A further object of the present invention is to provide, for a relatively weak cover, such as one constructed from a synthetic plastic, or the like, improved means for rendering certain vulnerable parts thereof comparatively stronger whereby these parts may withstand rough usage to which they are normally subjected.

Still another object of the invention is to provide for a wheel structure, a self-sustaining, form retaining cover which is arranged to be resiliently, locally flexed away from the wheel structure to render the rear side thereof accessible for servicing appurtenances associated with the wheel such as a tire valve or wheel balancing weights or for removing the cover therefrom and which may be provided with a radially outwardly extending portion arranged to overlie the outer side of the tire rim of the wheel structure and the outer side wall of a tire in the tire rim, the cover being further provided as at the peripheral parts thereof or the parts thereof which engage the wheel structure retaining means, with a reinforced, relatively rigidified section capable of withstanding hard usage without breaking and yet not detracting from the desired flexibility of the cover.

Another object of the invention is to provide for a wheel structure, a cover assembly including a cover portion constructed and arranged to be resiliently flexed locally away from the wheel structure, the cover having improved means for strengthening the same, said means being constructed to present a reinforced cover part arranged for free pivotal engagement with retaining means on the wheel structure whereby flexure of the cover will result in evently distributed stresses being imposed thereon, thereby avoiding the imposition of severe bending strains to accommodate the flexing action.

In accordance with the general features of this invention, there is provided herein a cover assembly including an outer flexible cover part formed from a resiliently flexible material such as a synthetic plastic, or the like, arranged for dispostion over the outer side of the wheel structure and having a cross-sectional configuration of such curvature and magnitude that it extends beyond the edge portion of the tire rim and over a part of the side wall of a tire therein and radially inwardly beyond the radially inner extremity of the tire rim to constitute in effect a continuation of the side wall of the tire to give the appearance of being a part thereof and to give the appearance of being a white side wall of the tire when colored white, there being provided at a periphery of the cover an enveloping, reinforcing member which reinforces the cover, which may serve as a pivot for the cover during flexure thereof, which may serve as an additional ornamental member if disposed on the outer side of the cover and which protects the cover against splitting or breakage resulting from forces applied thereto either during use of the wheel or during a pry-off operation for removal of the cover.

In accordance with other general features of the invention, there is provided herein a reinforcing arrangement for a resiliently, flexible cover member, the reinforcing arrangement comprising, in the various embodiments shown herein, an edging or beading formed from a material having greater strength than that of the cover itself, this beading being secured in enveloping relationship around a part of the cover and having a portion thereof on each side of the parts so enveloped, the portions being formed in surface engagement with the adjacent part of the cover or being formed in spaced relationship therewith to form ornamental, reinforcing beading.

Other objects and advantages of my invention will become apparent from the following description and accompanying drawings in which:

Figure 1 is a fragmentary, cross-sectional view of a wheel structure embodying one form of my invention;

Figure 2 is a side elevational view of the construction shown in Figure 1 with parts broken away for illustrative purposes;

Figure 3 is a fragmentary, cross-sectional view of a wheel structure showing a modified form of my invention;

Figure 4 is a fragmentary, cross-sectional view of a wheel structure showing a form of my invention slightly modified from that shown in Figure 3;

Figure 5 is a fragmentary, cross-sectional view of a wheel structure showing a still further modified form of my invention;

Figure 6 is a fragmentary, side elevational view of the construction shown in Figure 5 with parts broken away for illustrative purposes;

Figure 7 is a fragmentary, cross-sectional view of a wheel structure embodying still another form of my invention;

Figures 8, 9, 10, 11, 12, 13 and 14 are fragmentary, cross-sectional views of still further modified forms of my invention.

It will be understood that the embodiments shown herein are for illustrative purposes only and may be changed or modified without departing from the spirit and scope of the invention as set forth in the appended claims.

Referring to the drawings and particularly to Figure 1, the reference character 10 designates generally a multi-flange, drop center type of tire rim which is connected as by riveting or welding or the like through a base flange 11 to a central body part or spider 12 which includes a central bolt-on flange 13. The drop center rim 10 is further provided with opposite side flanges 14, opposite intermediate flanges 15 and opposite edge portions 16. A suitable tire 17 having an inner tube 18 and a valve stem 19 is mounted upon the rim, one of the side walls 14 having an orifice through which the valve stem 19 may project. The spider 12 is provided with a radially outer flange 12a, which as shown more clearly in Figure 2, has portions formed to be spaced from the radially inner surface of the flange 11 to provide spaced apertures 20.

The embodiment of the invention shown in Figure 1 comprises a cover assembly which includes an outer annular portion 21, preferably formed from a resiliently, elastically, locally flexible form retaining, self-sustaining material such as synthetic plastic or the like, and a central circular part 22 which is secured thereto in a manner to be described presently. The circular member 22 is arranged to overlie the spider or load bearing portion 12 of the wheel and may be constructed from the same material as the cover part 21 or from a light metal capable of taking a highly lustrous finish or which may be enamelled, if desired.

There is provided on the wheel structure a plurality of radically inwardly extending bumps 23 which are arranged to receive in snap-on, pry-off relationship, a snap-on flange 24 terminating in a peripheral snap-on bead 25, the flange 24 forming the axially inner extremity of a central cover element 26 which is preferably circular and axially crowned to serve as a backing member for the central portion of the cover member 22. Since the member 26 is ordinarily concealed by the central cover portion 22 it may be made from a cheaper grade of metal and thus may be constructed with considerable strength without adding to the cost of the cover assembly.

As shown on the drawings, there is provided, at each of the depressed parts of the flange 12a, a resilient spring finger 27 having a substantially goose-neck shape and terminating in a radially outwardly axially inwardly, obliquely disposed portion 28, which, as will be seen presently, serves to retain the cover members 21 and 22 upon the wheel structure in snap-on pry-off relationship.

The cover member 21 is provided with a radial expanse of such magnitude that the outer peripheral part thereof extends outwardly beyond the edge portion 16 of the tire rim and into overlying relationship with a radially inner part of the side wall of the tire 17 thereby to provide, in effect, a gradually inwardly curved continuation of the side wall so that it gives the appearance of being a part thereof. With such a construction it will be understood that when the wheel is operated under load bearing conditions, the side wall of the tire 17 will expand laterally and to this end the cover member 21, as previously indicated, is constructed from a self-sustaining material having resilient flexibility such as a synthetic plastic or the like so that the cover may be temporarily flexed locally, axially outwardly to accommodate this lateral distortion of the tire and will, by virtue of its own self-sustaining characteristics, snap back into its initial intended position relative to the wheel structure without requiring additional retaining means for maintaining the intended position. It will be understood that a wheel cover of the foregoing nature is somewhat weaker than a cover of metal or the like and thus is subject to splitting and breakage particularly at the outer peripheral edge thereof, at the point which is engaged by the retaining means 27 or at the point where a pry-off tool is applied to accomplish removal of the same.

To the end that the cover may be protected against such breakage, particularly at the points enumerated, and as an important feature of the present invention, reinforced parts of the cover are provided at these points, these reinforced parts being preferably rendered stronger than the remaining part of the cover.

In accordance with one aspect of my invention, the inner peripheral margin of the cover member 21 is formed as at 29 into a bead which in turn is enveloped by the outer peripheral part of the cover 22 which is likewise beaded as at 30. Thus an interlocking arrangement is provided. If the central cover part 22 is constructed from metal or any other material which is comparatively stronger than the cover member 21 and is thus strong enough to withstand the pressures imposed thereon during a pry-off operation without breakage, then the bead 30 may be utilized as the reinforcing instrumentality. On the other hand, if further reinforcement is desired, this being particularly the case when both of the cover members 21 and 22 are of a relatively weak, plastic material, then there is provided for the beaded junction of the covers, a reinforcing structure 31 which may be in the form of an annulus or may be individual spaced elements, but which in any event is of a comparatively stronger nature than the cover and is formed to envelop the substantially axially inwardly extending protuberance provided at the junction of the covers. Thus it will be seen that while the desirable attributes of a relatively weak, locally resiliently flexible cover are obtained, the disadvantage of breakage thereof during retention on the wheel and during a pry-off operation are entirely obviated.

It will be understood that the outer peripheral margin of the cover member 21 is likewise subjected to hard usage, first because of the constant flexing action to which it is subjected during rotation of the wheel to accommodate the lateral expansion of the tire 17 and also during flexure thereof away from the wheel by a manual operation to render the rear side thereof accessible for a pry-off operation or for servicing of the tire valve stem or wheel balancing weights and secondly, because of the radially outward expanse thereof whereby it is in a position to be abraded by curbing or other obstacles against which the vehicle is driven. This being the case, it is highly desirable that the outer peripheral portion of the cover member 21 be potected and, in accordance with my invention, this is accomplished herein by suitably reinforcing this outer peripheral marginal part.

While this reinforcing or rigidifying of the marginal part of the cover may be accomplished in many ways such as by chemical treatment of the plastic whereby the margin thereof is rendered stronger, such an advantage is obtained in the construction of Figure 1 by the provision of an annular enveloping member 32 which, as shown herein, comprises an annulus of comparatively strong material such as metal or the like, which has lateral parts thereof so formed cross-sectionally that these parts envelop the edge of the cover 21. The member 32 is cross-sectionally shaped in the manner disclosed in Figure 10 and, preferably, the extreme radially outer margin of the cover is crimped therein to provide a secure attachment.

In providing a reinforcing construction such as that shown at 32 in Figure 1 several distinct advantages are obtained. As previously indicated, the cover member 21 is protected against splitting from the edge. Furthermore, a smooth rounded surface is presented to the side wall of the tire whereby abrasion of the cover thereagainst will not cause the tire to become worn at that point. Lastly, the axially outer portion of the reinforcing bead 32 may be provided with a color different from that of the cover 21, or its metal may be enamelled or given a highly lustrous finish whereby the cover and the associated wheel structure are further ornamented by this ornamental border effect.

It will also be noted that the reinforcing member 31 disposed axially inwardly of an intermediate portion of the entire cover assembly is, if desired, provided with marginal flanges 31a each of which extends beyond the beaded part and over the cover surface a considerable distance to reinforce the same beyond the reinforcement provided by the beaded portion. The flange which overlies the axially inner surface of the cover member 22 may, if desired, be provided with a terminal lip 31b which is bent away from the cover thereby to aid in retaining the same in spaced relationship from the surface of the spider 12.

The construction shown in Figure 3 is similar to that described above and shown in Figure 1 except that the wheel cover, formed from a resiliently flexible material such as a synthetic plastic or the like, has an outer annular part 33 and a central part 34 formed integrally from a circular sheet of the desired material. The cover parts 33 and 34 are joined by an integral, substantially axially inwardly extending bead 35 around which is disposed an enveloping reinforcing member 36 of stronger material formed similar to that shown at 32 in Figure 1. It will be seen that broadly the reinforcing members 32 and 36 constitute a cross-sectionally rounded member having a slot therein for receiving the part of the cover which is to be reinforced and rendered comparatively strong. By a comparison of Figures 3 and 4, it will be seen that when the bead 35a, shown in Figure 4, extends only partially into the reinforcing member, the attached relationship between the cover and the reinforcing member is obtained by a clamping action of the edges of the reinforcing member against the adjacent portions of the surface of the cover, while in the construction in Figure 3, the bead 35 contains more of the cover material and thus substantially fills the reinforcing member 36 thereby rendering the secured attachment between the reinforcing member and the cover more secure.

In the construction shown in Figure 5 the cover comprises an outer annular part 37 and a central circular hub cap simulating part 38, the latter being similar in construction to the member 26 of the construction shown in Figure 1. In this construction also, the hub cap simulating cover portion 38 is provided with an axially inwardly extending snap-on flange 39 having a peripheral snap-on bead 40 adapted to be resiliently sprung over humps 23 formed on the outer surface of the spider or central load bearing portion 12 of the wheel structure.

The cover part 37 is preferably provided with a cross-sectional configuration of such shape and magnitude that it extends radially outwardly to entirely conceal the outer side of the tire rim 10 and radially inwardly beyond the radially inner extremity of the tire rim and on to a part of the body part 12 of the wheel structure.

This outer portion 37 of the cover assembly is formed into two annular sections, an outer section 41 and an inner section 42, these sections being divided by an integral, substantially axially outwardly extending ribbed part 43. If desired, the section 41 of the cover member may be provided with an orifice 41a through which the valve stem 19 of the inner tube 8 may extend and protrude, thereby to be available for ready attachment of the nozzle of an air hose for inflation of the tire. The outer cover portion 37 is formed from a sheet material and may be constructed from a resiliently flexible material such as a synthetic plastic or the like, whereby the section 41 thereof may be flexed locally, resiliently outwardly to render the rear side thereof accessible for adjustment of wheel balancing weights or the like or, if desired, may be constructed from some other material such as metal sheet or the like, whereupon access to the rear side of the cover portion 37 is obtained by complete removal thereof from the wheel structure in a manner to be presently described.

As will be seen from Figure 5 the radially inner extremity of the section 42 of the cover member 37 extends radially inwardly over the outer side of the wheel a sufficient distance so that it may be disposed in sandwiched relationship between the outer surface of the wheel and the axially inner surface of the radially outer extremity 44 of the central cover member 38. Thus it will be seen that if the outer cover member 37 is first applied to the wheel structure in the position shown in Figure 5 and then the cover member 38, and particularly the flange 39 and bead 40 thereof, is snapped over the humps 23, the radially outer extremity 44 of the cover 38 will rest tightly against the inner peripheral margin of the section 42 of the outer cover member thereby to retain the latter tightly upon the wheel structure. In such a construction the outer cover part is readily removed from the wheel structure by merely first removing the central cover part 38.

To the end that the outer cover portion 37 may be efficiently reinforced against splitting and to the end that the cover may be further ornamented, the axially outwardly extending bead 43 formed intermediately of the cover portion 37 is enveloped by an annulus 45 having a substantially circular cross-section and having a slot therein for receiving the bead 43, the lateral edges of the annulus being turned toward one another to clampingly engage the adjacent portion of the axially outer surface of the cover 37 to provide a secure attachment therewith. The annulus 45 may be formed from any suitable material but preferably, particularly if the cover portion 37 is formed from a relatively weak material, is constructed from a comparatively strong material thereby to more efficiently reinforce the cover. It will also be seen that the annulus 45 serves admirably as additional surface ornamentation for the cover. This bead may be formed from a plastic of differentiating color from that of the cover 37 or may be formed from metal, in which case it may be either enamelled or provided with a highly lustrous, polished finish.

To the end that the outer peripheral portion of the cover member 37 may be rendered comparatively stronger and may be relatively rigidified, a reinforcing annulus 46 is secured thereto. This annulus 46 may be made from a material similar to the annulus 45 and serves the same purpose as described in connection with the latter. Specifically, the annulus constitutes an annular strip of material bent to provide a substantial U-shaped cross-sectional configuration, thereby to provide arms 47 which may extend over opposite sides of the marginal part of the cover 37 and which may, if desired, be provided with a curvature enabling the edge of the cover 37 to conform to the configuration of the extreme outer edge of the edge portion 16 of the tire rim 10.

In the construction shown in Figure 7, the cover comprises an annulus 48 having a cross-sectional configuration of such shape and magnitude that it extends radially outwardly beyond the edge 16 of the tire rim 10 and in overlying relationship with the outer side wall of the tire 17 in the rim 10 and radially inwardly beyond the radially inner extremity of the tire rim. In this construction also, the cover constitutes in effect a continuation of the side wall of the tire by virtue of its gradual axially inward curvature as it extends radially inwardly of the wheel structure. It will be seen that the outer part of the cover 48 is curved outwardly as at 48a to present a smooth, non-abrading, non-cutting surface to the side wall of the tire 17.

Any suitable retaining means may be provided for securing the cover in detachable relationship on the outer side of the wheel structure; however, in the present instance the retaining means includes a plurality of clips 49 each being associated with one of the apertures 20 between the base flange 11 and the axially inwardly extending flange 12a of the body part 12 of the wheel structure. The axially outer part of the clips 49 are similar to those disclosed in Figures 1, 3 and 4, in that they are resilient for radial distortion and include a portion 50 extending obliquely, radially outwardly, axially inwardly for receiving an attachment portion at the inner peripheral edge of the cover member 48. The clips are further provided with axially inwardly extending arms 51 terminating in obliquely disposed, axially outwardly, radially inwardly extending fingers 52, the terminal ends of which, when the arms 51 are urged inwardly of the apertures 20, bite into the radially outer surface of the flange 12a to provide a secure attachment of the retaining member 49 to the wheel structure. If desired the clips may be further provided with axially inwardly extending arms 53 which constitute the terminals of the portions 50 thereof, these arms 53 bearing against the radially inner surface of the arms 51 to slightly rigidify the resilient action of the clips.

The cover member 48, as indicated previously, is attached to the clips by engagement of the inner peripheral part thereof. In order that the rear side of the cover 48 may be rendered accessible without requiring removal of the same from the wheel structure, it is contemplated that the cover 48 be constructed from a locally, resiliently flexible sheet material such as a synthetic plastic or the like, and consequently the cover may split or be broken under the influence of this flexing action, particularly at the part thereof which engages the retaining clips. Furthermore, considerable stress is applied to the inner marginal part of the cover during the application of a pry-off tool thereagainst to withdraw the cover from the retaining clips 49.

Accordingly the cover 48 is reinforced at the inner peripheral edge thereof by reinforcing means which may be either in the form of an annulus or in the form of circumferentially spaced individual members. The reinforcing means is preferably constructed from strip material having comparatively greater strength than that of the cover 48 and, as shown in Figure 7 at 54, is provided with a rolled, beaded cross-sectional configuration, the inner peripheral part 55 of the cover member 48 being rolled with the member 54 to provide a secure attachment between the parts. As shown in the drawing, the reinforcing member 54 is provided with a flange part 56 which extends some distance, radially outwardly over the axially outer surface of the cover member 48 and is also provided with a beaded portion 57 arranged to overlie the opposite side of the inner peripheral margin of the cover, this bead 57 providing for the retaining engagement with the respective clips 49, thus relieving the material of the cover from retaining stresses. It will, therefore, be seen that the flange 56 serves as additional ornamentation for the axially outer side of the cover while the bead 57 serves as a retaining element and also serves to receive the point of a pry-off tool during removal of the cover 48 from the wheel structure.

Another attribute of the construction shown in Figure 7 is that the reinforcing member 54, since it presents a rounded surface to the retaining means and to the adjacent portion of the outer surface of the spider part 12, affords an efficient pivot for the cover member during axial outward flexure thereof from the wheel structure either during rotation of the wheel or for the purpose of rendering the rear side thereof accessible. Thus, because of this pivotal action at the inner peripheral part of the cover 48, severe bending stresses which might fatigue the material of the cover are avoided and instead are evenly distributed transversely of the portion of the cover being flexed.

In Figures 8 to 14 various cross-sectional configurations of my novel reinforcing structure are disclosed. In each of these figures the reference numeral 58 designates a part of the member being reinforced and while these parts are shown as being of a single thickness, it will be understood that the structures of Figures 8 to 14 may be equally well adapted to reinforce beaded or ribbed parts of a member such as shown in Figures 3 and 4, or interlocked portions of separate members as shown in Figure 1.

In the construction shown in Figure 8, the reinforcing member 59 is similar to that disclosed at 46 in Figure 5, in that it is U-shaped in cross-section and comprises a pair of flanges 60 and 61, respectively, which are folded around the edge of the member 58 and into overlying relationship with opposite sides thereof.

In the construction of Figure 9, the reinforcing member includes a flange portion 62 arranged to overlie one side of the member 58 and a bead 63 into which the edge of the member 58 is curled, this bead being disposed on the side of the part of the member which is enveloped to be available as means to render the member 58 stronger at the part enveloped or to be available as ornamentation therefor.

In the construction shown in Figure 10, the reinforcing structure for rendering stronger a part of the member 58 comprises a member having a substantially circular cross-section and being provided with a member 64 having a substantially circular cross-section and having a slot therein for receiving the enveloped part of the member 58, this enveloped part being crimped within the member 64 as shown at 65 to effectively prevent withdrawal of the reinforcing member 64 from the member 58.

In the construction shown in Figure 11, the reinforcing member 66 is provided with opposed beads 67 and 68, the bead 67 being rolled with the edge of the member 58 crimped therein and the bead 68 being disposed on the opposite side of the member 58 and being forced into a crimped portion of the member 58. Thus it will be seen that an extremely secure attachment is obtained between the reinforcing member 66 and the member 68.

In the construction shown in Figure 12, the reinforcing member 69 is cross-sectionally configurated to provide a flange 70 arranged to overlie and reinforce one side of the edge portion of the member 58 while the remainder thereof is formed into a bead 71 which is available as a pry-off member or for ornamentation of the member 58 and terminates in a flange 72 which overlies the opposite side of the member 58 to cooperate with the flange 70 to reinforce the same and to hold the reinforcing member 69 upon the member 58 in secure relationship.

In the construction shown in Figure 13, the reinforcing member 73 is similar to that disclosed in Figure 9 except that the flange 74 thereof is itself reinforced by the provision of a turned back margin 75.

In the construction of Figure 14, the reinforcing means 76 is also similar to that shown in Figure 9 except that the flange 77 thereof is bent to engage in a crimp 78 in the member 58 thereby to more securely attach the reinforcing member thereto.

From the foregoing it will be seen that there is provided herein improved, efficient retaining means for a relatively weak member, this retaining means serving to render a portion of the member stronger and also being available as ornamentation therefor.

As applied specifically to wheel covers, it will be seen that by virtue of my invention a relatively weak wheel cover may be so reinforced that the peripheral parts thereof are prevented from breaking and splitting when subjected to normal use and furthermore parts thereof which are retained on the wheel structure are protected against breakage by virtue of the retaining action of the wheel or parts thereof and are also protected from breakage by a pry-off tool utilized to remove the cover from the wheel.

What I claim is:

1. In a wheel structure including a tire rim and a load sustaining body part, a circular cover member for substantially concealing the tire rim and having a radially inner portion thereof disposed adjacent to the body part of the wheel, said cover member being formed from a thin relatively highly resiliently flexible sheet material adapted to be temporarily manually flexed away from the wheel to afford access behind the cover to said portion adjacent to the wheel body part, the wheel body part having means thereon for retaining the cover on the wheel, and a reinforcing sheet metal annulus protectively engaging said radially inner portion of the cover member and cooperating in snap-on pry-off relationship with said retaining means and bearing against said wheel body part to maintain the cover in retained relation on the wheel, said annulus being accessible by flexing the cover member away from the wheel for insertion of a pry-off tool between the annulus and the wheel body part to release the annulus and thereby the cover member from the retaining means to remove the cover from the wheel.

2. In a wheel structure including a tire rim and a load sustaining body part, a circular wheel cover of a magnitude to substantially cover the tire rim and having a radially inner annular portion thereof extending generally axially inwardly and radially outwardly for disposition adjacent to the wheel body part, the wheel having retaining means thereon radially outwardly of said radially inner portion of the cover and arranged to engage said cover portion to clamp the same against the wheel body part, and a protective and reinforcing sheet metal annulus in engagement with and carried by said radially inner cover portion and providing a relatively stiff rib-like structure for maintaining said cover portion in retained clamped relation between said retaining means and the wheel body part, the cover radially outwardly from said retained portion being resiliently deflectable axially outwardly for access therebehind with a pry-off tool to be applied to said rib-like structure of the cover for prying the cover away from the wheel body part and releasing the same from said retaining means.

3. In a wheel structure including a tire rim and a load sustaining body part, a circular wheel cover of a magnitude to substantially cover the tire rim and having a radially inner annular portion thereof extending generally axially inwardly and radially outwardly for disposition adjacent to the wheel body part, the wheel having retaining means thereon radially outwardly of said radially inner portion of the cover and arranged to engage said cover portion to clamp the same against the wheel body part, and a protective and reinforcing sheet metal annulus in engagement with and carried by said radially inner cover portion and providing a relatively stiff rib-like structure for maintaining said cover portion in retained clamped relation between said retaining means and the wheel body part, the cover radially outwardly from said retained portion being resiliently deflectable axially outwardly for access therebehind with a pry-off tool to be applied to said rib-like structure of the cover for prying the cover away from the wheel body part and releasing the same from said retaining means, said annulus having a generally radially inwardly extending flange portion having cover steadying engagement with the wheel body part.

4. In a wheel structure including a tire rim and a load sustaining body part, a cover member for substantially concealing the tire rim and having a radially inner portion disposed for opposition to the wheel body part, cover retaining clips disposed on the wheel structure behind the cover member and adapted to engage retaining with said radially inner portion of the cover member, and a sheet metal reinforcing and protective annulus having a bead-like formation encompassing said radially inner portion of the cover and having flanges extending therefrom on opposite sides of said cover portion, said annulus being intermediately directly engaged by said clips and bearing against the wheel body part and being clamped thereto by the clips for retaining the cover in place on the wheel.

5. In a cover assembly for disposition at the outer side of a vehicle wheel, separate divergently related circular cover members one of which is of larger diameter and annular form and has its inner margin in engagement with the outer margin of the other cover member, at least the outer of said cover members being formed from thin resiliently flexible sheet material adapting it to be flexed substantially in an axial direction for access behind the cover, the joined margins of the cover members extending toward the inner side of the cover, and a sheet metal annulus of generally channel-like form securing said cover member margins together and affording a protective bead thereabout engageable with retaining means on the wheel, said annulus being accessible for pry-off by flexing of said outer cover member.

6. In a cover assembly for disposition at the outer side of a vehicle wheel, separate divergently related circular cover members one of which is of larger diameter and annular form and has its inner margin in engagement with the outer margin of the other cover member, at least the outer of said cover members being formed from thin resiliently flexible sheet material adapting it to be flexed substantially in an axial direction for access behind the cover, the joined margins of the cover members extending toward the inner side of the cover, and a sheet metal annulus of generally channel-like form securing said cover member margins together and affording a protective bead thereabout engageable with retaining means on the wheel, said annulus being accessible for pry-off by flexing of said outer cover member, said outer annular cover member having a protective sheet metal reinforcing annulus secured to the outer margin thereof to protect the same against outer edge damage.

GEORGE ALBERT LYON.

REFERENCES CITED

The following references are of record in the file of this patent:

UNITED STATES PATENTS

| Number | Name | Date |
|---|---|---|
| 1,167,124 | Sloper | Jan. 4, 1916 |
| 1,200,061 | Wentworth | Oct. 3, 1916 |
| 1,234,387 | Pugh et al. | July 24, 1917 |
| 1,403,446 | Rothmann | Jan. 10, 1922 |
| 1,810,510 | Winne | June 16, 1931 |
| 1,865,031 | McCormick et al. | June 28, 1932 |
| 1,889,773 | Chamberlin | Dec. 6, 1932 |
| 1,890,123 | Linn | Dec. 6, 1932 |
| 1,933,496 | Jandus | Oct. 31, 1933 |
| 1,946,326 | Lyon | Feb. 6, 1934 |
| 1,948,273 | Lyon | Feb. 20, 1934 |
| 1,956,633 | Tyson | May 1, 1934 |
| 1,972,216 | Dowty | Sept. 4, 1934 |
| 1,995,392 | Lyon | Mar. 26, 1935 |
| 2,015,352 | Reid | Sept. 24, 1935 |
| 2,019,987 | Lyon | Nov. 5, 1935 |
| 2,070,819 | Zerk | Feb. 16, 1937 |
| 2,148,995 | Nelson | Feb. 28, 1939 |
| 2,193,106 | Lyon | Mar. 12, 1940 |
| 2,239,367 | Lyon | Apr. 22, 1941 |
| 2,239,898 | Lyon | Apr. 29, 1941 |